US012561631B2

(12) United States Patent
Takahashi et al.

(10) Patent No.: US 12,561,631 B2
(45) Date of Patent: Feb. 24, 2026

(54) WORK MANAGEMENT SYSTEM, CALIBRATION WORK MANAGEMENT SERVER, AND CALIBRATION WORK MANAGEMENT METHOD

(71) Applicant: Hitachi Industry & Control Solutions, Ltd., Tokyo (JP)

(72) Inventors: Nobuo Takahashi, Tokyo (JP); Kojiro Tomotsune, Tokyo (JP)

(73) Assignee: HITACHI INDUSTRY & CONTROL SOLUTIONS, LTD., Tokyo (JP)

( * ) Notice: Subject to any disclaimer, the term of this patent is extended or adjusted under 35 U.S.C. 154(b) by 113 days.

(21) Appl. No.: 18/415,813

(22) Filed: Jan. 18, 2024

(65) Prior Publication Data

US 2024/0249225 A1 Jul. 25, 2024

(30) Foreign Application Priority Data

Jan. 24, 2023 (JP) ................................ 2023-008882

(51) Int. Cl.
G06Q 10/0631 (2023.01)
G06Q 10/0639 (2023.01)
(52) U.S. Cl.
CPC . *G06Q 10/06316* (2013.01); *G06Q 10/06395* (2013.01)
(58) Field of Classification Search
CPC ................ G06Q 10/06; G06Q 10/063; G06Q 10/06316; G06Q 10/06395
See application file for complete search history.

(56) References Cited

U.S. PATENT DOCUMENTS 5,918,191 A 6/1999 Patel
10,012,590 B2 * 7/2018 Chu ........................ C12Q 1/686
(Continued)

FOREIGN PATENT DOCUMENTS

JP H11-194162 A 7/1999
JP 2013-228803 A 11/2013

OTHER PUBLICATIONS

M. Wang, Q. Dai, X. Zhang, X. Luo and R. Zhong, "A RFID-enabled MES for real-time pharmaceutical manufacturing supervision," 2010 IEEE International Conference on RFID-Technology and Applications, Guangzhou, China, 2010, pp. 49-53.*
(Continued)

*Primary Examiner* — Timothy Padot
(74) *Attorney, Agent, or Firm* — MATTINGLY & MALUR, PC

(57) ABSTRACT

A work management system includes a calibration instruction recorder and a work instruction recorder, wherein the calibration instruction recorder receives and stores a calibration work record of the calibration work from a first terminal, stores the calibration work record, stores device identification information included in the calibration work record as the device identification information, and stores "usable" or "not usable" as use propriety of the device, depending on whether the calibration determination result included in the calibration work record is "appropriate" or "inappropriate". The work instruction recorder receives a work request from a second terminal and transmits the work contents to the second terminal when the use propriety of the device is "usable" and transmits an error notification to the second terminal when the use propriety of the device is "not usable". The device is used for the work performed by the worker as a user of the second terminal.

5 Claims, 10 Drawing Sheets

(56)  References Cited

U.S. PATENT DOCUMENTS

| | | | | |
|---|---|---|---|---|
| 2003/0139640 A1* | 7/2003 | Whittacre | .............. | G16H 20/10 |
| | | | | 600/1 |
| 2012/0078410 A1* | 3/2012 | Wong | .............. | G06Q 10/06395 |
| | | | | 700/109 |
| 2016/0076992 A1* | 3/2016 | Gillespie | ................ | B25J 9/1674 |
| | | | | 356/244 |
| 2017/0178047 A1* | 6/2017 | Schroeder | ........ | G06Q 10/06395 |
| 2019/0219517 A1* | 7/2019 | Horiguchi | .............. | G06Q 10/06 |

OTHER PUBLICATIONS

L. Gao, Z. Gao, F. Wu, S. Liu and L. Liu, "Research on Visual Monitoring and Auxiliary Maintenance Technology of Equipment Based on Augmented Reality," 2019 11th International Conference on Intelligent Human-Machine Systems and Cybernetics (IHMSC), Hangzhou, China, 2019, pp. 93-97.*
Indian Office Action received in corresponding Indian Application No. 202414004400 dated Oct. 13, 2025.

* cited by examiner

FIG. 2

| DEVICE TO BE CALIBRATED | WORK | WORK CONTENTS | DATE OF WORK | WORKER | |
|---|---|---|---|---|---|
| D0043 | T0245 | ######## | 2023/3/5 | O3485 | ← 310 |
| ... | ... | ... | ... | ... | |

FIG. 3

| DEVICE TO BE CALIBRATED | WORK | MEASURED VALUES | CALIBRATION DETERMINATION RESULT | |
|---|---|---|---|---|
| D0043 | T0245 | ######## | APPROPRIATE | ← 320 |
| ... | ... | ... | ... | |

| DATE OF WORK | WORKER | APPROVAL RESULT | DATE OF APPROVAL | APPROVER |
|---|---|---|---|---|
| 2023/3/5 | O3485 | APPROVED | 2023/3/6 | O4345 |
| ... | ... | ... | ... | ... |

FIG. 4

| WORK M | PRODUCT | STEP NAME | WORK CONTENTS | DEVICE USED | |
|---|---|---|---|---|---|
| M0013 | P0874 | ######## | ######## | D0041 | ← 330 |
| ... | ... | ... | ... | ... | |

| WORK M | WORK | PRODUCT | STEP NAME | |
|--------|------|---------|-----------|---|
| M0013 | T0574 | P0874 | ######## | |
| ... | ... | ... | ... | |

| | WORK CONTENTS | DEVICE USED | DATE OF WORK | WORKER |
|---|--------------|-------------|--------------|--------|
| | ######## | D0041 | 2023/3/7 | O3499 |
| | ... | ... | ... | ... |

| WORK | PRODUCT | RECORDED VALUES | DEVICE USED | |
|------|---------|-----------------|-------------|---|
| T0574 | P0874 | ######## | D0041 | |
| ... | ... | ... | ... | |

| | DATE OF WORK | WORKER |
|---|--------------|--------|
| | 2023/3/7 | O3499 |
| | ... | ... |

| DEVICE | USE PROPRIETY | EXPIRATION DATE | DATE OF UPDATE | |
|--------|---------------|-----------------|----------------|---|
| D0049 | USABLE | 2024/4/10 | 2023/3/10 | |
| ... | ... | ... | ... | |

FIG. 8

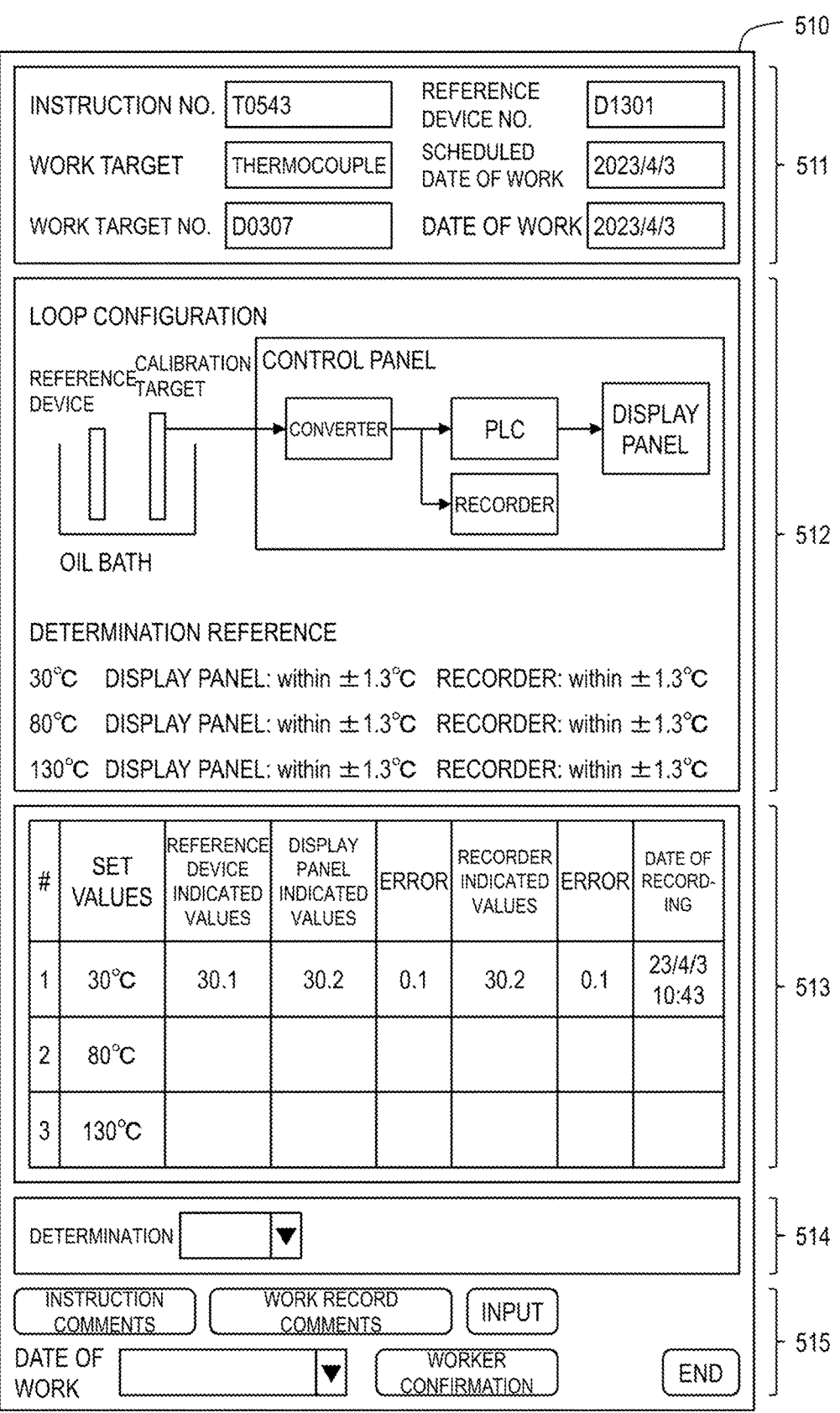

510

INSTRUCTION NO. T0543       REFERENCE DEVICE NO. D1301

WORK TARGET       THERMOCOUPLE       SCHEDULED DATE OF WORK       2023/4/3

WORK TARGET NO.       D0307       DATE OF WORK       2023/4/3

511

LOOP CONFIGURATION

REFERENCE DEVICE       CALIBRATION TARGET       CONTROL PANEL

CONVERTER → PLC → DISPLAY PANEL

RECORDER

OIL BATH

DETERMINATION REFERENCE

30°C   DISPLAY PANEL: within ±1.3°C   RECORDER: within ±1.3°C

80°C   DISPLAY PANEL: within ±1.3°C   RECORDER: within ±1.3°C

130°C  DISPLAY PANEL: within ±1.3°C   RECORDER: within ±1.3°C

512

| # | SET VALUES | REFERENCE DEVICE INDICATED VALUES | DISPLAY PANEL INDICATED VALUES | ERROR | RECORDER INDICATED VALUES | ERROR | DATE OF RECORD-ING |
|---|---|---|---|---|---|---|---|
| 1 | 30°C | 30.1 | 30.2 | 0.1 | 30.2 | 0.1 | 23/4/3 10:43 |
| 2 | 80°C | | | | | | |
| 3 | 130°C | | | | | | |

513

DETERMINATION [ ▼ ]

514

INSTRUCTION COMMENTS    WORK RECORD COMMENTS    INPUT

DATE OF WORK [ ▼ ]    WORKER CONFIRMATION    END

| | | | |
|---|---|---|---|
| INSTRUCTION TYPE NO. | M0043 | MANUFACTURING LOT | |
| PRODUCT NAME CODE | P3743 | SCHEDULED DATE OF MANUFACTURE | |
| PRODUCT NAME | XYZ TABLET | DATE OF MANUFACTURE | |
| STEP NAME | MIXING STEP | SCHEDULED PRODUCTION AMOUNT | |
| DEVICE USED | D0051,D0053 | | |

531

| # | WORK CONTENTS | INDICATED VALUES | RECORDED VALUES | WORKER IN RECORDING | DATE AND TIME OF RECORDING | ▲ |
|---|---|---|---|---|---|---|
| 1 | CARRY IN RAW MATERIALS | OK | | | | |
| 2 | ADD LACTOSE | | | | | |
| 3 | ADD CORNSTARCH | | | | | ▼ |

532

INSTRUCTION COMMENTS

DATE OF MANUFACTURE [ ▼ ] MANUFACTURING AMOUNT [ ▼ ]

WORKER [ ▼ ] MANUFACTURING MANAGER CONFIRMATION END

533

1

WORK MANAGEMENT SYSTEM, CALIBRATION WORK MANAGEMENT SERVER, AND CALIBRATION WORK MANAGEMENT METHOD

CROSS REFERENCE TO RELATED APPLICATIONS

This application claims benefit of foreign priority to Japanese Patent Application No. 2023-008882 filed on Jan. 24, 2023, which is incorporated by reference in its entirety.

BACKGROUND OF THE INVENTION

1. Field of the Invention

The present invention relates to a work management system, a calibration work management server, and a calibration work management method for managing work using measuring instruments.

2. Description of the Related Art

At product manufacturing sites, work procedures and work contents for workers are strictly defined by standard work regulations. For example, in the manufacture of pharmaceuticals, work procedures are established in which raw materials are carried into the site, mixed at a predetermined ratio, and the mixed raw materials are formed into tablets and packaged. Workers perform work according to the work procedures and keep records.

A series of work includes work that involves measuring physical quantities such as weight, volume, and temperature. For example, it is necessary to measure the input amount of raw materials, the stirring temperature of raw materials, stirring time, the weight of the product, and the like to adhere to the specified values in the work procedures and record the measured values.

Measuring instruments used for measurements need to be calibrated periodically, for example, keep their predetermined precision. As a technique for managing calibration work on measuring instruments used for work, there is a calibration work management system for measuring instruments described in JP H11-194162A.

The use of the calibration work management system for measuring instruments described in JP H11-194162A makes it possible to perform rational and accurate calibration work. However, simply introducing the calibration work management system does not necessarily prevent work using measuring instruments whose precision is not guaranteed. For example, a worker may mistakenly use a measuring instrument whose calibration expiration date has passed or may use a measuring instrument that is not under the control of the calibration work management system. Further, the work is not limited to product manufacturing work, but also includes inspection work for manufactured products, maintenance work for equipment and devices, and the like.

SUMMARY OF THE INVENTION

The present invention has been made to solve the above problems and makes it an object thereof to provide a work management system, a calibration work management server, and a calibration work management method that enable appropriate management of work using measuring instruments.

2

In order to achieve the above object, a work management system according to the present invention includes: a calibration instruction recorder and a work instruction recorder, wherein the calibration instruction recorder can access a calibration instruction database that stores calibration work identification information, identification information on a device to be calibrated, calibration work contents, and calibration worker identification information, a calibration record database that stores the calibration work identification information, the device identification information, the calibration worker identification information, date and time of calibration work, and a calibration determination result, and a device information database that stores the device identification information and use propriety of the device, the work instruction recorder can access a work instruction database that stores work identification information, work contents, worker identification information, and the identification information on the device used, a work record database that stores the work identification information, the worker identification information, and date and time of work, and the device information database, the calibration instruction recorder performs processing of receiving a calibration work request from a first terminal, acquiring identification information on the device to be calibrated by a calibration worker who uses the first terminal and the calibration work contents, and transmitting the identification information and calibration work contents to the first terminal, receiving a calibration work record of the calibration work from the first terminal and storing the calibration work record in the calibration record database, storing device identification information included in the calibration work record as the device identification information in the device information database, and storing "usable" or "not usable" as use propriety of the device in the device information database, depending on whether the calibration determination result included in the calibration work record is "appropriate" or "inappropriate", the work instruction recorder performs processing of receiving a work request from a second terminal, acquiring identification information on the work performed by the worker who uses the second terminal, the work contents, the worker identification information, the identification information on the device used, and the use propriety of the device used, transmitting the work contents and the identification information on the device used to the second terminal when the use propriety of the device is "usable", receiving a work record of the work from the second terminal, and storing the work record in the work record database, and transmitting an error notification to the second terminal when the use propriety of the device is "not usable".

The present invention can provide a work management system, a calibration work management server, and a calibration work management method, which enable appropriate management of work using measuring instruments. Other problems, configurations, and advantageous effects than those described above will become apparent from the following description of embodiments.

BRIEF DESCRIPTION OF THE DRAWINGS

FIG. 2 is a data configuration diagram of a calibration instruction database according to the embodiment.

FIG. 3 is a data configuration diagram of a calibration record database according to the embodiment.

FIG. 4 is a data configuration diagram of a manufacturing instruction master database according to the embodiment.

FIG. 5 is a data configuration diagram of a manufacturing instruction database according to the embodiment.

FIG. 6 is a data configuration diagram of a manufacturing record database according to the embodiment.

FIG. 7 is a data configuration diagram of a device information database according to the embodiment.

FIG. 8 is a screen configuration diagram of a calibration work instruction recording screen according to the embodiment.

FIG. 10 is a screen configuration diagram of a manufacturing work planning screen according to the embodiment.

DETAILED DESCRIPTION OF THE EMBODIMENTS

<Overview of Manufacturing Work Management System>

A manufacturing work management system according to a mode for carrying out the present invention (embodiment) will be described below. The manufacturing work management system (work management system) includes a calibration work management server, a manufacturing work management server (work management server), and a database server. The manufacturing work management server manages manufacturing work by creating work plans (work contents, work instructions) for manufacturing work to manufacture products, giving instructions (directions) to workers about the work contents (work procedures), recording work, and the like.

The calibration work management server manages calibration work on devices (equipment) including measuring instruments used in manufacturing work. The manufacturing work management system prevents the creation of work plans (work instructions) and work instructions involving an uncalibrated device (its calibration expiration date has passed), thus preventing work using such an uncalibrated device. The use of such a manufacturing work management system makes it possible to appropriately manage work using a calibrated measuring instrument.

<Configuration of Manufacturing Work Management System>

Figure 1:
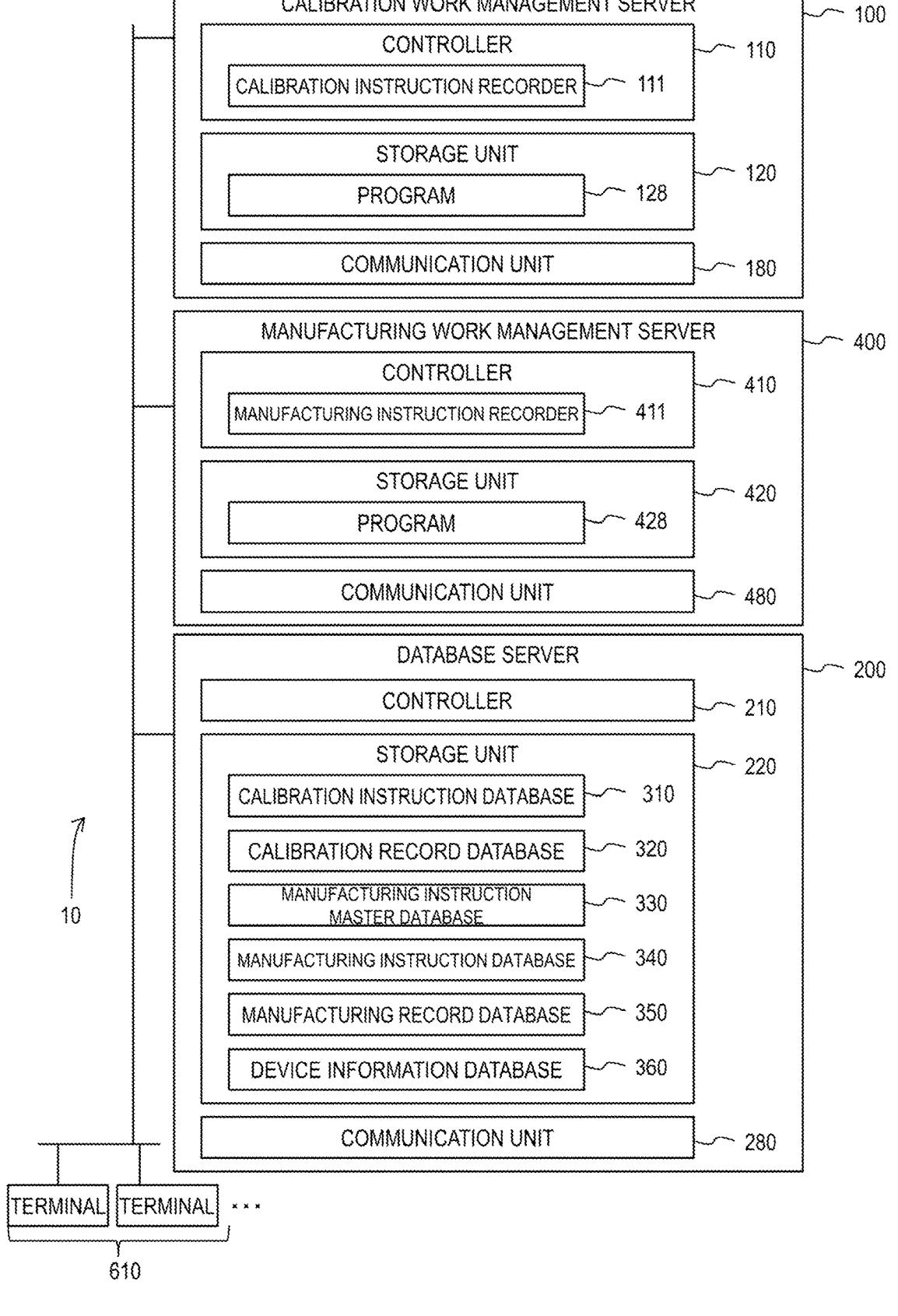
FIG. 1 is an overall configuration diagram of a manufacturing work management system according to an embodiment of the present invention.

FIG. 1 is an overall configuration diagram of a manufacturing work management system 10 according to this embodiment. The manufacturing work management system 10 includes a calibration work management server 100, a manufacturing work management server 400, and a database server 200. The calibration work management server 100, the manufacturing work management server 400, and the database server 200 are connected through a network and can communicate with each other. A worker who performs calibration work, manufacturing work, and creation of plans (instructions) for manufacturing work can use a terminal 610 to communicate with the calibration work management server 100 and the manufacturing work management server 400.

<Configuration of Database Server>

The database server 200 is a computer, including a controller 210, a storage unit 220, and a communication unit 280. The controller 210 is configured including a central processing unit (CPU) and performs search processing and update processing for a database stored in the storage unit 220 to be described later, in response to requests from the calibration work management server 100 and the manufacturing work management server 400. Note that the controller 210 executes the database search processing and update processing according to requests (instructions) from the calibration work management server 100 (see a calibration instruction recorder 111 to be described later) and the manufacturing work management server 400 (see a manufacturing instruction recorder 411 to be described later). Therefore, it may be described here that the calibration instruction recorder 111 or the manufacturing instruction recorder 411 searches through or updates the database, and the like.

The communication unit 280 includes a communication device and is capable of transmitting and receiving data to and from the calibration work management server 100 and the manufacturing work management server 400. The storage unit 220 is configured including a storage device such as a read only memory (ROM), a random access memory (RAM), a solid state drive (SSD), and a hard disk drive (HDD). The storage unit 220 stores a calibration instruction database 310, a calibration record database 320, a manufacturing instruction master database 330, a manufacturing instruction database 340, a manufacturing record database 350, and a device information database 360.

<Database Server: Calibration Instruction Database>

FIG. 2 is a data configuration diagram of the calibration instruction database 310 according to this embodiment. The calibration instruction database 310 is tabular data, for example, in which one row (record) is a schedule for calibration work of a measuring instrument or a device (equipment) including a measuring instrument, and includes instructions to a worker. The record in the calibration instruction database 310 includes columns (attributes) of target device, work, work contents, date of work, and worker.

The target device is identification information on a device (measuring instrument) to be calibrated. The work is identification information on calibration work. The work contents are work contents of the calibration work, including contents displayed on a calibration work instruction recording screen 510 to be described later (see an area 512 shown in FIG. 8). The date of work is a scheduled date of the calibration work. The worker is identification information on a worker assigned with the calibration work. The calibration instruction database 310 may also include other attributes such as an identification number of a reference device used in the calibration work, for example.

<Database Server: Calibration Record Database>

FIG. 3 is a data configuration diagram of the calibration record database 320 according to this embodiment. The calibration record database 320 is tabular data, for example, in which one row (record) indicates a record of calibration work. The record in the calibration record database 320 includes columns (attributes) of target device, work, measured value, calibration determination result, date of work, worker, approval result, date of approval, and approver.

The target device, work, date of work, and worker correspond to the target device, work, date of work, and worker in the calibration instruction database 310, respectively. However, the date of work and the worker are the actual date of calibration work and the worker who actually performed the calibration work.

The measured value is the measured value (indicated value) of the target device or reference device in the calibration work. The calibration determination result is the result of the calibration work, which is "appropriate" or "inappropriate". In general, when the difference between the measured values of the target device and the reference device (error) is within a predetermined range, the result is "appropriate".

The approval result is the approval or disapproval of the calibration determination result by the approver of the calibration work, which is "approved" or "disapproved". The date of approval is the date on which the result is approved (approval or disapproval is determined). The approver is identification information on the approver. Note that the approval result, date of approval, and approver of an unapproved (pending approval) record is "N/A" (Not Applicable).

Note that the calibration record database 320 may also include other attributes such as an identification number of the reference device used in the calibration work, for example.

<Database Server: Manufacturing Instruction Master Database>

FIG. 4 is a data configuration diagram of the manufacturing instruction master database 330 according to this embodiment. The manufacturing instruction master database 330 is tabular data, for example, in which one row (record) indicates a manufacturing work (manufacturing instruction) template. The record in the manufacturing instruction master database 330 includes columns (attributes) of work master, product, step name, work contents, and device used.

The work master ("Work M" in FIG. 4) is identification information on a manufacturing work template. The product is identification information on a product (to be manufactured) as a target of the manufacturing work. The step name is the name of each step of the manufacturing work. The work contents are contents of the manufacturing work, including work procedures and contents displayed on a manufacturing work planning screen 530 and a manufacturing work instruction recording screen 540 to be described later (see an area 532 shown in FIG. 10 and an area 542 shown in FIG. 11). The device used is identification information on a device (equipment) used in manufacturing work.

<Database Server: Manufacturing Instruction Database>

FIG. 5 is a data configuration diagram of the manufacturing instruction database 340 according to this embodiment. The manufacturing instruction database 340 is tabular data, for example, in which one row (record) is a schedule for manufacturing work to manufacture a product, including instructions to workers, and is prepared based on the manufacturing instruction master database 330. The record in the manufacturing instruction database 340 include columns (attributes) of work master, work, product, step name, work contents, device used, date of work, and worker.

The work master ("Work M" in FIG. 5) indicates identification information on a manufacturing work template and corresponds to the work master in the manufacturing instruction master database 330 (see FIG. 4). The work is identification information on manufacturing work. The product, step name, work contents, and device used correspond to the product, step name, work contents, and device used in the manufacturing instruction master database 330. The date of work is a scheduled date of manufacturing work. The worker is identification information on a worker assigned with manufacturing work. Note that the manufacturing instruction database 340 may also include other attributes such as a manufacturing lot and a scheduled production amount.

<Database Server: Manufacturing Record Database>

FIG. 6 is a data configuration diagram of the manufacturing record database 350 according to this embodiment. The manufacturing record database 350 is tabular data, for example, in which one row (record) indicates a record of manufacturing work. The record in the manufacturing record database 350 includes columns (attributes) of work, product, recorded value, device used, date of work, and worker.

The work, product, device used, date of work, and worker correspond to the work, product, device used, date of work, and worker in the manufacturing instruction database 340, respectively. However, the date of work and the worker are the actual date of manufacturing work and the worker who actually performed the manufacturing work.

The recorded value is a record when the manufacturing work is performed, including contents inputted on the manufacturing work instruction recording screen 540 to be described later (see an area 542 shown in FIG. 11).

Note that the manufacturing record database 350 may also include other attributes such as the manufacturing lot and production amount.

<Database Server: Device Information Database>

FIG. 7 is a data configuration diagram of the device information database 360 according to this embodiment. The device information database 360 is tabular data, for example, in which one row (record) indicates a calibration status of a device. The record in the device information database 360 includes columns (attributes) of device, use propriety, expiration date, and date of update.

The device is identification information on a device (measuring instrument), which corresponds to the target device in the calibration instruction database 310 (see FIG. 2). The use propriety indicates whether the device is usable or not. The expiration date is a calibration expiration date. When the result of calibration work is appropriate (compliant), "usable" is stored in the use propriety and the calibration expiration date is stored in the expiration date. When the result of calibration work is inappropriate (non-compliant), "not usable" is stored in the use propriety and "N/A" is stored in the expiration date. The date of update is the date when the contents of the record are updated.

As described above, the calibration instruction recorder 111 can access the calibration instruction database 310 which stores the identification information on calibration work (see the "work" attribute), the identification information on the device to be calibrated (see the "target device" attribute), the calibration work contents (see the "work contents" attribute), and the identification information on the calibration worker (see the "worker" attribute).

The calibration instruction recorder 111 can also access the calibration record database 320 which stores the identification information on the calibration work, the identification information on the device, the identification information on the calibration worker, the date and time of the calibration work (see the "date of work" attribute), and the calibration determination result (see the "calibration determination result" attribute).

The calibration instruction recorder 111 and the work instruction recorder (see the manufacturing instruction recorder 411) can access the device information database 360 which stores the identification information on the device (see the "device" attribute) and the use propriety of the device (see the "use propriety" attribute).

The work instruction recorder can access a work instruction database (see the manufacturing instruction database 340) which stores identification information on work (see the "work" attribute), work contents, worker identification information, and identification information on the device used (see the "device used" attribute).

The work instruction recorder can access a work record database (see the manufacturing record database 350) which stores work identification information, worker identification information, and the date and time of work (see the "date of work" attribute).

The work instruction recorder can access a work instruction master database (see the manufacturing instruction master database 330) which stores work master identification information, work contents, and identification information on a device used.

The device information database 360 further includes an expiration date indicating a valid expiration date when the use propriety is "usable".

<Configuration of Calibration Work Management Server>

Referring back to FIG. 1, the calibration work management server 100 will be described. The calibration work management server 100 is a computer, including a controller 110, a storage unit 120, and a communication unit 180. The communication unit 180 includes a communication device and is capable of transmitting and receiving data to and from the database server 200. The communication unit 180 is also capable of transmitting and receiving data to and from the terminal 610.

The storage unit 120 is configured including a storage device such as a ROM, a RAM, and an SSD. The storage unit 120 stores a program 128. The program 128 includes descriptions of calibration instruction recording processing (see FIG. 12) and calibration work approval processing (see FIG. 13) to be described later. The controller 110 is configured including a CPU, and includes the calibration instruction recorder 111.

<Controller: Calibration Instruction Recorder>

The calibration instruction recorder 111 gives a work instruction (work direction including work contents) to a calibration worker and stores a work record in the calibration record database 320 (see FIG. 3). This will be described in detail below. Upon receiving a calibration instruction request from the terminal 610 operated by a worker performing calibration work, the calibration instruction recorder 111 refers to the calibration instruction database 310 (see FIG. 2) and transmits calibration work contents (calibration work instructions) assigned to the worker to the terminal 610.

The terminal 610 displays a calibration work instruction recording screen 510 (see FIG. 8) to be described later, to prompt the worker to execute work and input a work record, and sends the inputted work record to the calibration work management server 100. The calibration instruction recorder 111 stores calibration work identification information, worker identification information, received work records, and the like in the calibration record database 320.

The calibration instruction recorder 111 also stores a record of approval of the calibration work in the calibration record database 320. This will be described in detail below. Upon receiving a request for recording calibration work from a terminal 610 operated by an approver who approves the calibration work, the calibration instruction recorder 111 refers to the calibration instruction database 310 and sends completed but unapproved calibration work to the terminal 610.

The terminal 610 displays a calibration work approval screen 520 to be described later (see FIG. 9), prompts the approver to input the approval result ("approved" or "disapproved"), and transmits the inputted approval result to the calibration work management server 100. The calibration instruction recorder 111 stores the approval result, date of approval, and approver identification information in the calibration record database 320.

<Calibration Work Instruction Recording Screen>

FIG. 8 is a screen configuration diagram of the calibration work instruction recording screen 510 according to this embodiment. An area 511 displays identification information on calibration work (see "instruction number"), an identification number of a device to be calibrated (see "work target number") and the like.

The area 512 displays work contents of the calibration work (see the work contents in the calibration instruction database 310 (see FIG. 2)). In FIG. 8, an instruction is given for determination by calculating errors based on values indicated by a reference device, a display panel, and a recorder when the set values are 30° C., 80° C., and 130° C.

An area 513 displays a work record inputted by the worker. In FIG. 8, the values indicated by the reference device, display panel, and recorder when the set value is 30° C. are already inputted.

In an area 514, a determination result is inputted as a result of the calibration work. The worker inputs the items in the area 513 and selects "Appropriate" or "Inappropriate" from a drop-down list displayed in the area 514. The worker then selects the date of work from a drop-down list in an area 515 and presses a "worker confirmation" button. After the button is pressed, the terminal 610 transmits the input contents in the areas 513, 514, and 515 to the calibration work management server 100 as a work record.

<Calibration Work Approval Screen>

Figure 9:
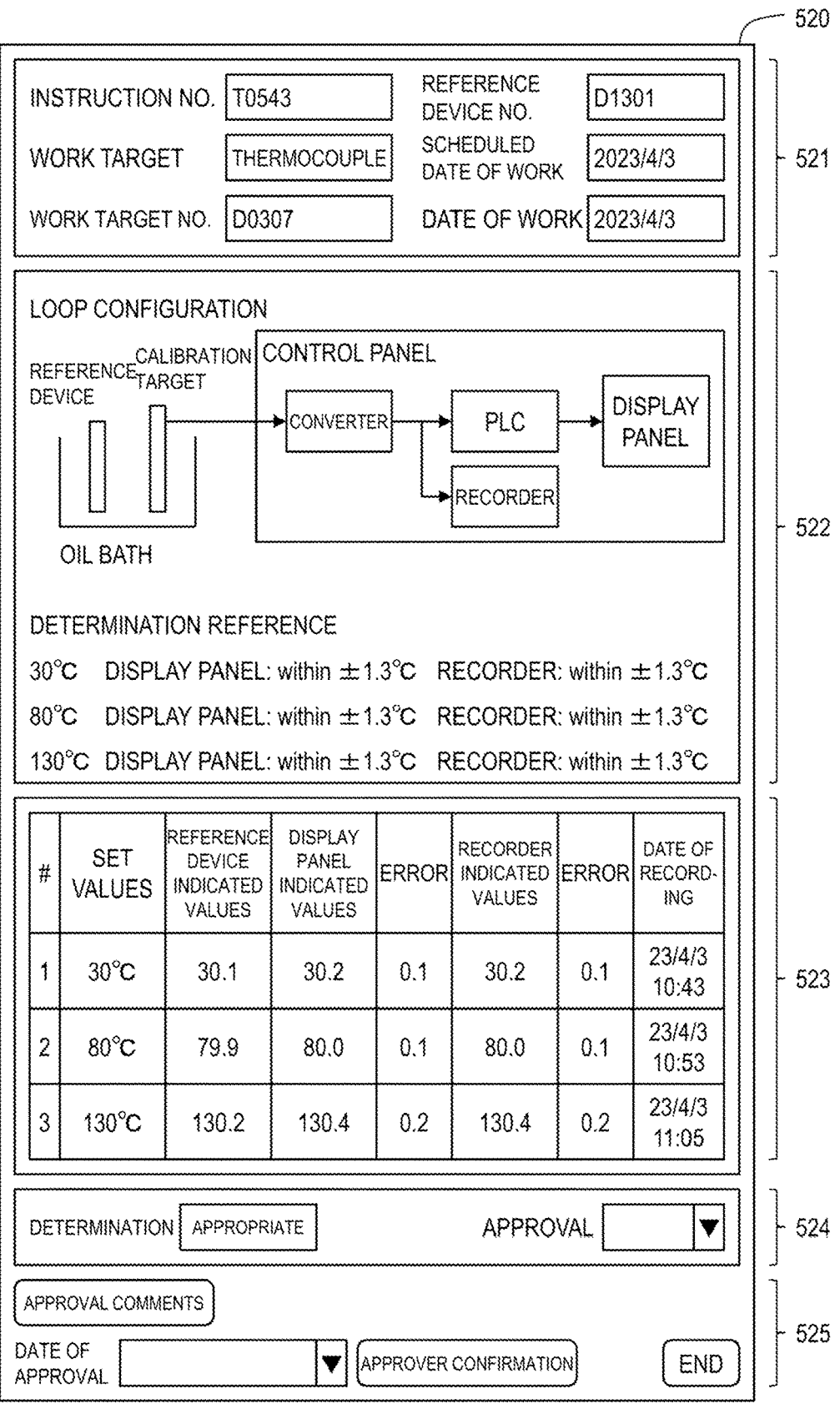
FIG. 9 is a screen configuration diagram of a calibration work approval screen according to the embodiment.

FIG. 9 is a screen configuration diagram of the calibration work approval screen 520 according to this embodiment. Areas 521 and 522 are the same as the areas 511 and 512 of the calibration work instruction recording screen 510 (see FIG. 8), respectively.

An area 523 displays a work record inputted by a calibration worker (see the area 513 of the calibration work instruction recording screen 510). An area 524 displays the determination result inputted by the calibration worker (see the area 514 of the calibration work instruction recording screen 510).

The approver selects "approved" or "disapproved" from an approval drop-down list displayed in the area 524 and selects the date of approval from a drop-down list in an area 525 before pressing an "approver confirmation" button. After the button is pressed, the terminal 610 transmits the input contents in the areas 524 and 525 to the calibration work management server 100 as an approval result.

<Configuration of Manufacturing Work Management Server>

Referring back to FIG. 1, the manufacturing work management server 400 will be described. The manufacturing work management server 400 is a computer, including a controller 410, a storage unit 420, and a communication unit 480. The communication unit 480 includes a communication device and is capable of transmitting and receiving data to and from the database server 200. The communication unit 480 is also capable of transmitting and receiving data to and from the terminal 610.

The storage unit 420 is configured including a storage device such as a ROM, a RAM, and an SSD. The storage unit 420 stores a program 428. The program 428 includes descriptions of manufacturing work planning processing (see FIG. 14) and manufacturing work instruction recording processing (see FIGS. 15 and 16) to be described later. The controller 410 is configured including a CPU, and includes the manufacturing instruction recorder 411.

The manufacturing instruction recorder 411 receives an instruction from a manufacturing work manager and stores the manufacturing work (manufacturing work instructions) in the manufacturing instruction database 340 (see FIG. 5). This will be described in detail below. Upon receiving a manufacturing instruction template request from a terminal 610 operated by the manager, the manufacturing instruction recorder 411 refers to the manufacturing instruction master database 330 (see FIG. 4) and transmits the manufacturing work template to the terminal 610.

The terminal 610 displays a manufacturing work planning screen 530 to be described later (see FIG. 10), prompts the manager to input the date of manufacture (scheduled date of manufacture) and the worker for the manufacturing work, and transmits the input contents to the manufacturing work management server 400. The manufacturing instruction recorder 411 stores identification information on manufacturing work, the received input contents, and the like in the manufacturing instruction database 340. Note that the manufacturing instruction recorder 411 confirms that the device to be used is usable on the date of manufacture, before storing in the manufacturing instruction database 340. When the device is not usable, the manufacturing instruction recorder 411 sends an error to the terminal 610.

The manufacturing instruction recorder 411 also gives a work instruction to the worker for the manufacturing work and stores a work record in the manufacturing record database 350 (see FIG. 6). This will be described in detail below. Upon receiving a manufacturing instruction request from the terminal 610 operated by a worker who performs manufacturing work, the manufacturing instruction recorder 411 refers to the manufacturing instruction database 340 and transmits manufacturing work (manufacturing work instructions) assigned to the worker to the terminal 610. Note that the manufacturing instruction recorder 411 confirms that the device to be used is usable on the date of manufacture, before transmitting to the terminal 610. When the device is not usable, the manufacturing instruction recorder 411 sends an error to the terminal 610.

The terminal 610 displays a manufacturing work instruction recording screen 540 to be described later (see FIG. 11), prompts the worker to input recorded values, and transmits the inputted recorded values and date and time of recording to the manufacturing work management server 400 as a work record. The manufacturing instruction recorder 411 stores manufacturing work identification information, worker identification information, received work records, and the like in the manufacturing record database 350.

<Manufacturing Work Planning Screen>

FIG. 10 is a screen configuration diagram of the manufacturing work planning screen 530 according to this embodiment. An area 531 displays identification information on a manufacturing work template (see "instruction type number"), an identification number of a product to be manufactured (see "product name code") and the like.

An area 532 displays work contents of the manufacturing work (see instruction contents and work contents in the manufacturing instruction master database 330 (see FIG. 4)) and work record items. FIG. 10 shows that, as the work contents, "carry in raw materials", "add lactose", "add cornstarch" are performed in this order.

The manager selects the date of work (date of manufacture), manufacturing amount, and worker who performs the manufacturing work from a drop-down list in an area 533, and presses a "manufacturing manager confirmation" button. After the button is pressed, the terminal 610 transmits the selected contents, including the date of work, manufacturing amount, and worker, to the manufacturing work management server 400.

<Manufacturing Work Instruction Recording Screen>

Figure 11:
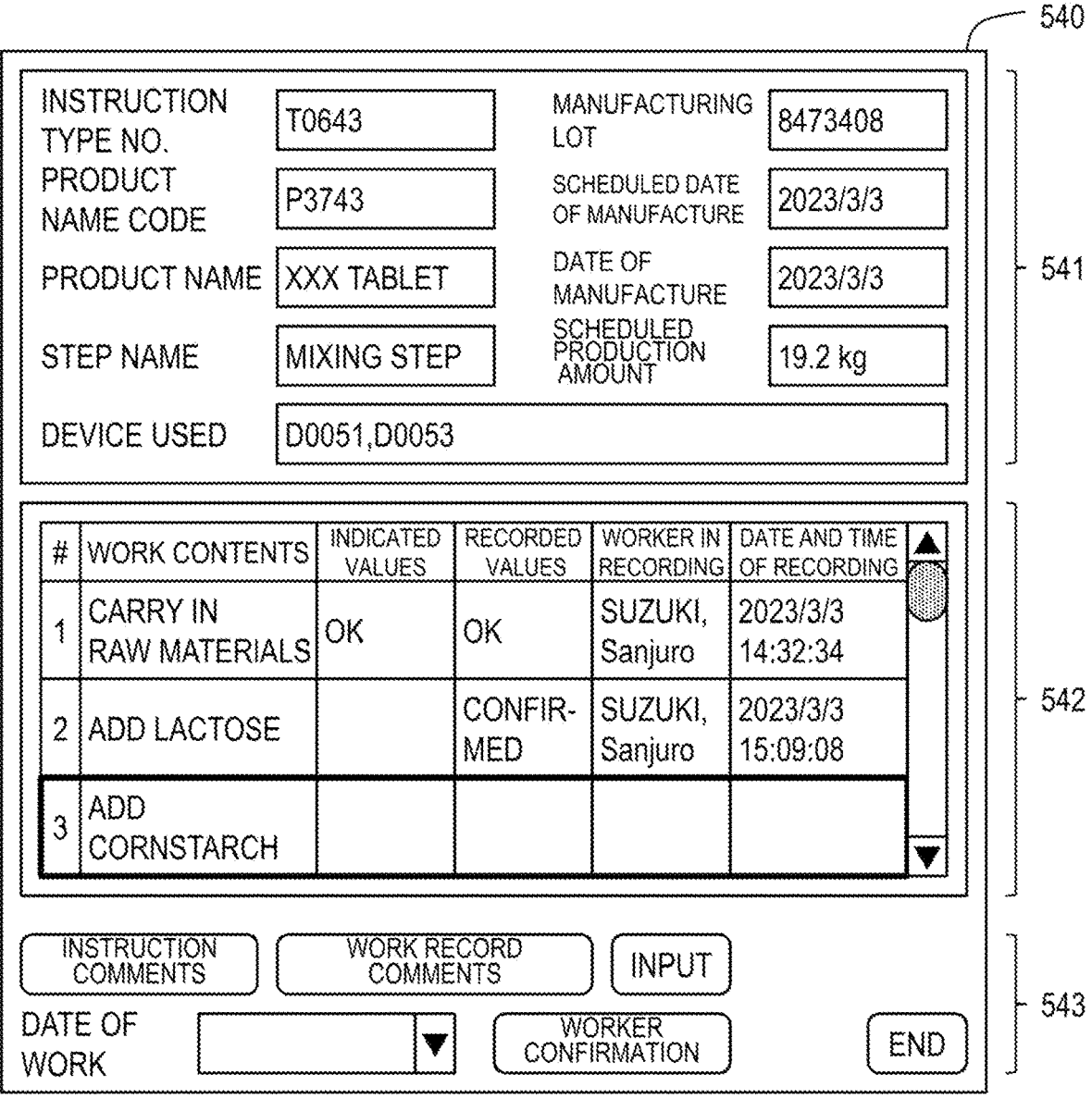
FIG. 11 is a screen configuration diagram of a manufacturing work instruction recording screen according to the embodiment.

FIG. 11 is a screen configuration diagram of the manufacturing work instruction recording screen 540 according to this embodiment. An area 541 is similar to the area 531 of the manufacturing work planning screen 530 (see FIG. 10). However, the date of manufacture and manufacturing amount selected by the manager on the manufacturing work planning screen 530 are displayed in the scheduled date of manufacture and scheduled production amount.

An area 542 is similar to the area 532 of the manufacturing work planning screen 530, except that the area 542 displays a work record including recorded values inputted by the worker and date and time of recording. In FIG. 11, works of "carry in raw materials" and "add lactose" are completed and records are inputted. Also, the next task is highlighted (encircled by a thick frame in FIG. 11).

The worker inputs the work record in the area 542 and selects the date of work from a drop-down list in an area 543 before pressing a "worker confirmation" button. After the button is pressed, the terminal 610 transmits the input contents in the area 542 to the manufacturing work management server 400 as a work record.

<Calibration Work Instruction Recording Processing>

Figure 12:
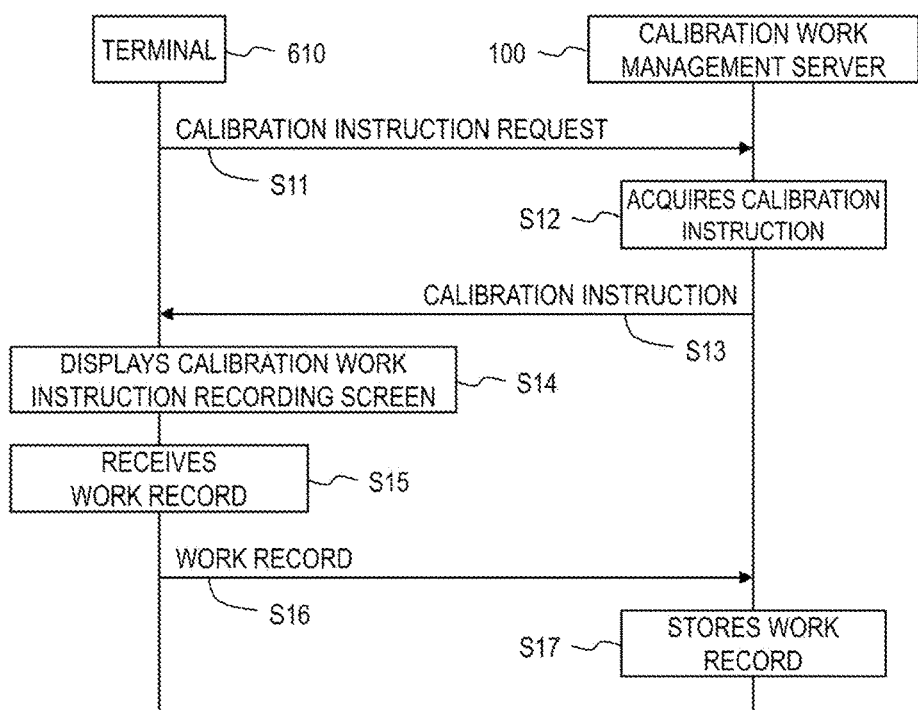
FIG. 12 is a sequence diagram of calibration work instruction recording processing according to the embodiment.

FIG. 12 is a sequence diagram of calibration work instruction recording processing according to this embodiment. With reference to FIG. 12, processing related to calibration work performed by the terminal 610 and the calibration work management server 100 will be described. Note that the terminal 610 is operated by a worker who performs calibration work. The worker is authenticated and identifiable by the calibration work management server 100.

In step S11, the terminal 610 transmits a calibration instruction (calibration work) request to the calibration work management server 100 as instructed by the worker.

In step S12, the calibration instruction recorder 111 in the calibration work management server 100 acquires calibration work assigned to the worker. More specifically, the calibration instruction recorder 111 searches for and acquires a record, from among the records in the calibration instruction database 310 (see FIG. 2), in which the worker is the worker who operates the terminal 610, the work is yet to be executed, and the date of work is earliest. Whether or not the work has been executed can be determined by the presence or absence of a corresponding record (with matching work attribute) in the calibration record database 320 (see FIG. 3).

In step S13, the calibration instruction recorder 111 transmits the contents of the record acquired in step S12 to the terminal 610 as a calibration instruction.

In step S14, the terminal 610 displays the calibration work instruction recording screen 510 (see FIG. 8) to prompt the worker to input a work record of the calibration work.

In step S15, the terminal 610 receives an input of the work record of the calibration work (see the area 513) from the worker.

In step S16, when the worker presses the "worker confirmation" button in the area 515 of the calibration work instruction recording screen 510, the terminal 610 transmits the inputted work record of the calibration work to the calibration work management server 100. The work record includes the measured values inputted in the area 513 (values indicated by the reference device and the like), the determination result (calibration determination result) inputted in the area 514, and the date of work inputted in the area 515.

In step S17, the calibration instruction recorder 111 stores the received work record in the calibration record database 320 (see FIG. 3). More specifically, the calibration instruction recorder 111 adds a record to the calibration record database 320, and stores the values of the target device and work in the record acquired in step S12 in the target device and work in the record. As the measured values, the calibration determination result, and the date of work, the calibration instruction recorder 111 stores the measured values, the calibration determination result, and the date of work included in the work record received in step S16. The calibration instruction recorder 111 stores identification information on the worker who operates the terminal 610 as the worker. The calibration instruction recorder 111 sets "N/A" for the approval result, date of approval, and approver.

<Calibration Work Approval Processing>

Figure 13:
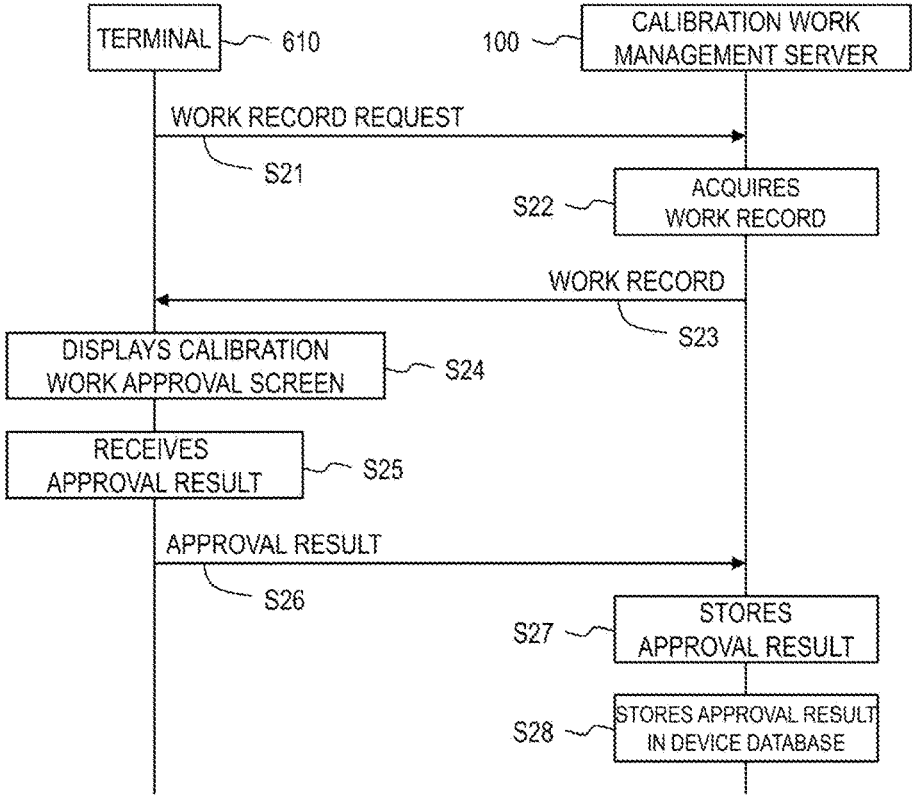
FIG. 13 is a sequence diagram of calibration work approval processing according to the embodiment.

FIG. 13 is a sequence diagram of calibration work approval processing according to this embodiment. With reference to FIG. 13, processing related to approval of calibration work performed by the terminal 610 and the calibration work management server 100 will be described. Note that the terminal 610 is operated by an approver who approves calibration work. The approver is authenticated and identifiable by the calibration work management server 100.

In step S21, the terminal 610 transmits a calibration work record request to the calibration work management server 100 as instructed by the approver.

In step S22, the calibration instruction recorder 111 in the calibration work management server 100 acquires a work record of unapproved calibration work. More specifically, the calibration instruction recorder 111 searches for and acquires a record whose approval result is "N/A" from among the records in the calibration record database 320 (see FIG. 3).

In step S23, the calibration instruction recorder 111 transmits the contents of the record acquired in step S22 to the terminal 610 as a work record.

In step S24, the terminal 610 displays the calibration work approval screen 520 (see FIG. 9) to prompt the approver to input an approval result (approved or disapproved).

In step S25, the terminal 610 receives input of the approval result (see the area 524) and date of approval (see the area 525) from the approver.

In step S26, when the approver presses the "approver confirmation" button in the area 525, the terminal 610 transmits the inputted approval result and date of approval to the calibration work management server 100.

In step S27, the calibration instruction recorder 111 stores the received approval result in the calibration record database 320 (see FIG. 3). More specifically, the calibration instruction recorder 111 stores the approval result and date of approval received in step S26, as the approval result and date of approval in the record acquired in step S22, respectively. The calibration instruction recorder 111 stores the identification information on the approver who operates the terminal 610 for the worker.

In step S28, the calibration instruction recorder 111 stores the approval result in the device information database 360 (see FIG. 7). More specifically, the calibration instruction recorder 111 adds a record to the device information database 360, and stores the value of the target device in the record acquired in step S22 for the target device in the record. As for the use propriety, the calibration instruction recorder 111 stores "usable" when the calibration determination result is "appropriate" and the approval result is "approved", and stores "not usable" when the calibration determination result is "inappropriate" or the approval result is "disapproved". When the approval result is "approved", the calibration instruction recorder 111 stores a calibration expiration date in the expiration date. The expiration date is, for example, a date after a predetermined period of time from the date of calibration work. The calibration instruction recorder 111 stores the same date as the date of approval for the date of update.

As described above, the calibration instruction recorder 111 receives a calibration work request from a first terminal (see the terminal 610) (see step S11).

The calibration instruction recorder 111 acquires identification information on a device to be calibrated by a calibration worker who uses the first terminal and also calibration work contents, and transmits the acquired information and contents to the first terminal (see steps S12 and S13).

The calibration instruction recorder 111 receives a calibration work record of the calibration work from the first terminal, and stores the record in the calibration record database 320 (see steps S16 and S17).

<Manufacturing Work Planning Processing>

Figure 14:
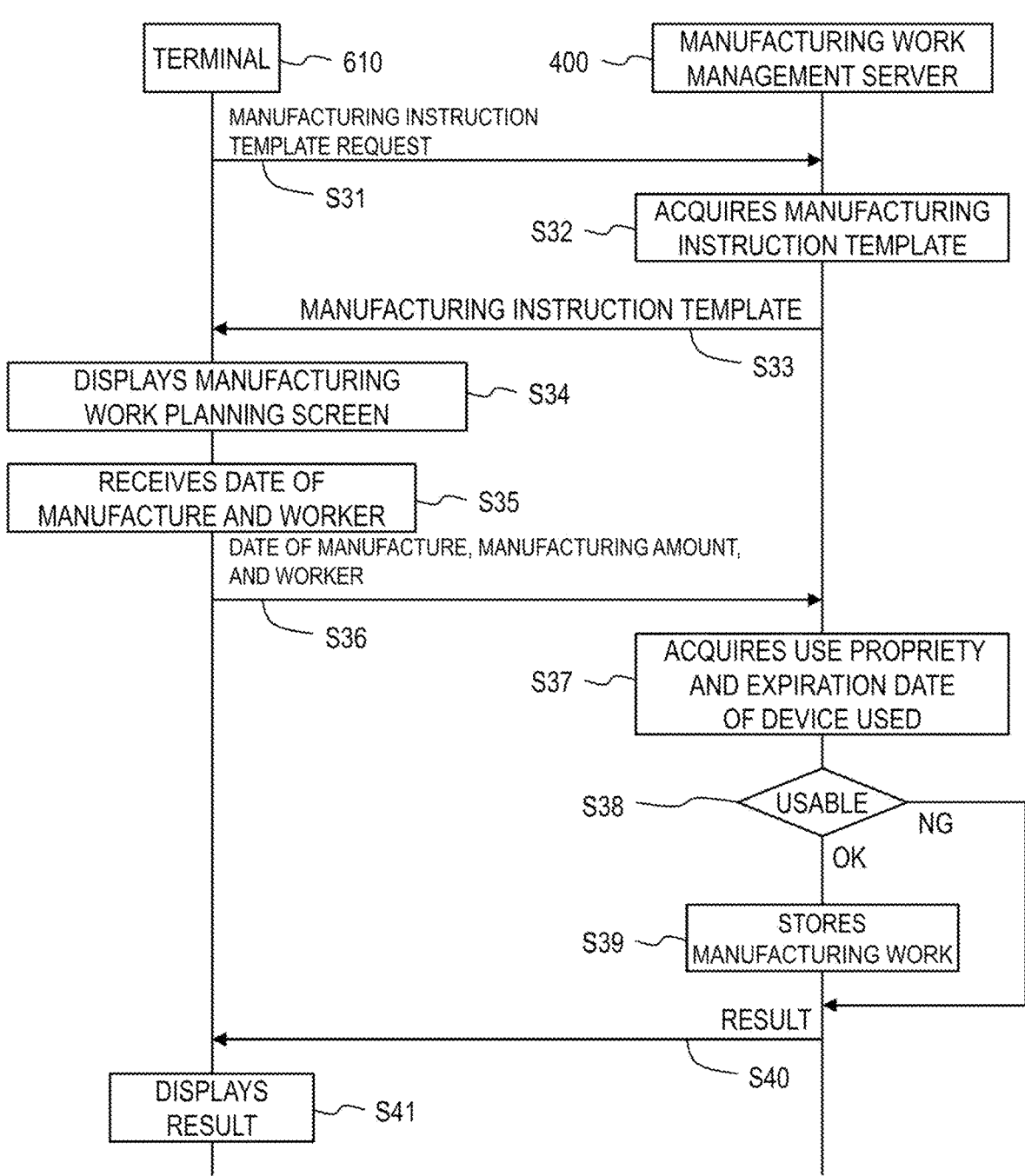
FIG. 14 is a sequence diagram of manufacturing work planning processing according to the embodiment.

FIG. 14 is a sequence diagram of manufacturing work planning processing according to this embodiment. With reference to FIG. 14, processing related to planning of manufacturing work (manufacturing instruction) performed by the terminal 610 and the manufacturing work management server 400 will be described. Note that the terminal 610 is operated by a manager who plans manufacturing work. The manager is authenticated and identifiable by the calibration work management server 100.

In step S31, the terminal 610 transmits a manufacturing instruction template request to the manufacturing work management server 400 to request for a template for manufacturing work instructed by the manager.

In step S32, the manufacturing instruction recorder 411 in the manufacturing work management server 400 acquires a record that serves as a template for the requested manufacturing work (manufacturing instruction) from the manufacturing instruction master database 330 (see FIG. 4).

In step S33, the manufacturing instruction recorder 411 transmits the contents of the record acquired in step S32 to the terminal 610 as a manufacturing instruction template.

In step S34, the terminal 610 displays the manufacturing work planning screen 530 (see FIG. 10) and prompts the manager to input the date of manufacture (scheduled date of manufacturing work), manufacturing amount, and worker (see the area 533).

In step S35, the terminal 610 receives the input of the date of manufacture, manufacturing amount, and worker.

In step S36, when the manager presses the "manufacturing manager confirmation" button in the area 533, the terminal 610 transmits the inputted date of manufacture, manufacturing amount, and worker to the manufacturing work management server 400.

In step S37, the manufacturing instruction recorder 411 acquires the use propriety and expiration date of the device used in the manufacturing work. More specifically, the manufacturing instruction recorder 411 acquires a record, from among the records in the device information database 360 (see FIG. 7), in which the device matches the identification information on the device used in the record acquired in step S32 and has the latest date of update. The manufacturing instruction recorder 411 then acquires the use propriety and expiration date for the record.

In step S38, the manufacturing instruction recorder 411 proceeds to step S39 when the device is usable (OK in step S38) and proceeds to step S40 when the device is not usable (NG in step S38). "Usable" means that the use propriety acquired in step S37 is "usable" and that the date of manufacture is before the expiration date acquired in step S37.

In step S39, the manufacturing instruction recorder 411 stores the manufacturing work (manufacturing instruction) in the manufacturing instruction database 340 (see FIG. 5). More specifically, the manufacturing instruction recorder 411 adds a record to the manufacturing instruction database 340, and stores the values of work master, product, step name, work contents, and device used in the record acquired in step S32, for the work master, product, step name, work contents, and device used in the record. The manufacturing instruction recorder 411 then allocates (newly generates) an identification number for the manufacturing work and stores it for the work. Subsequently, the manufacturing instruction recorder 411 stores the date of manufacture and worker (worker identification information) received in step S36 for the date of work and the worker.

In step S40, the manufacturing instruction recorder 411 notifies the terminal 610 of a result of the success or failure in planning the manufacturing work (whether or not the manufacturing work is stored in the manufacturing instruction database 340).

In step S41, the terminal 610 displays the result received in step S40. When the device is not usable in step S38 (see NG in step S38), the result may include the identification information and name of the device that is not usable, and the expiration date of the device. In this case, the terminal 610 may display such information together with the planning failure (error notification).

<Manufacturing Work Instruction Recording Processing>

Figure 15:
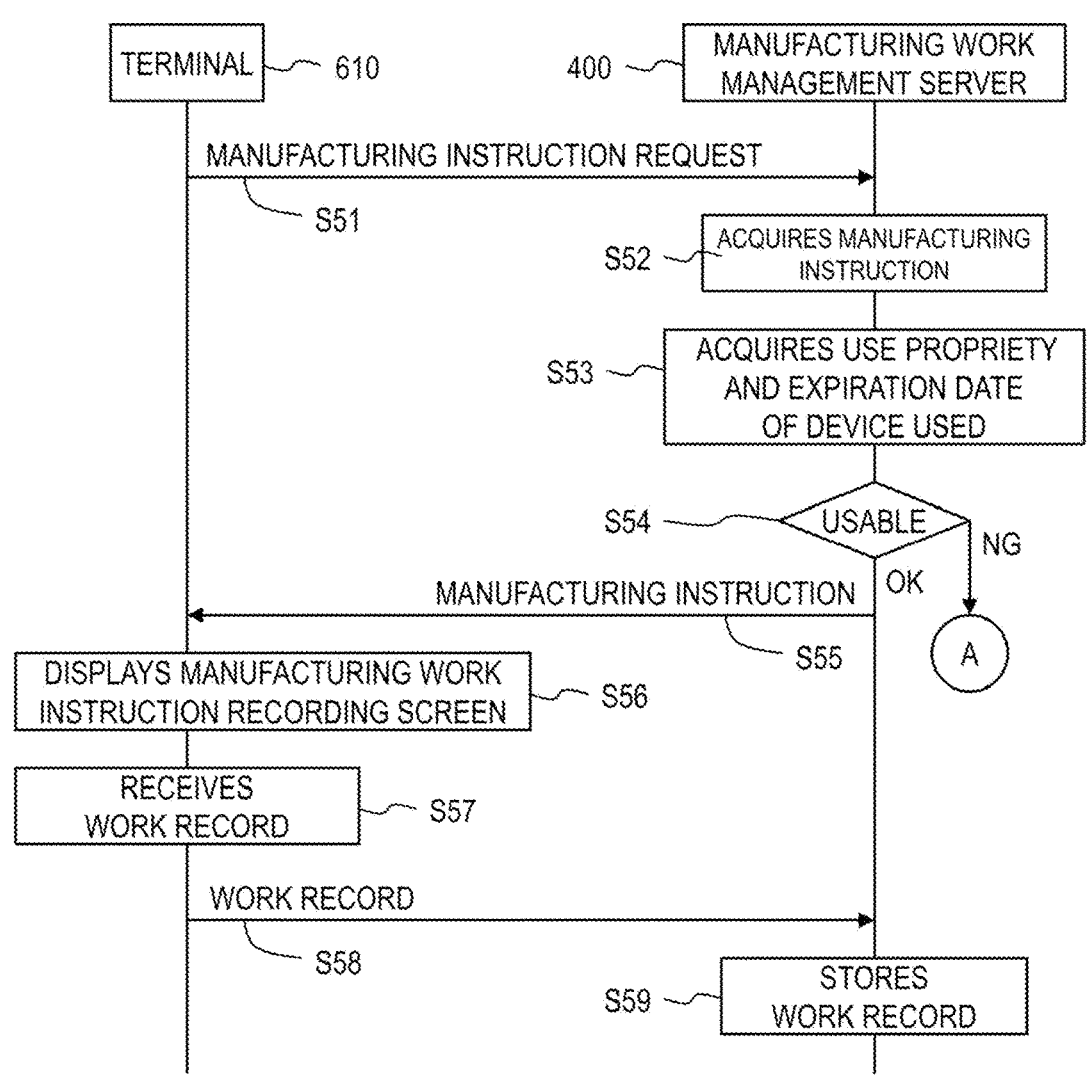
FIG. 15 is a sequence diagram of manufacturing work instruction recording processing according to the embodiment.
Figure 16:
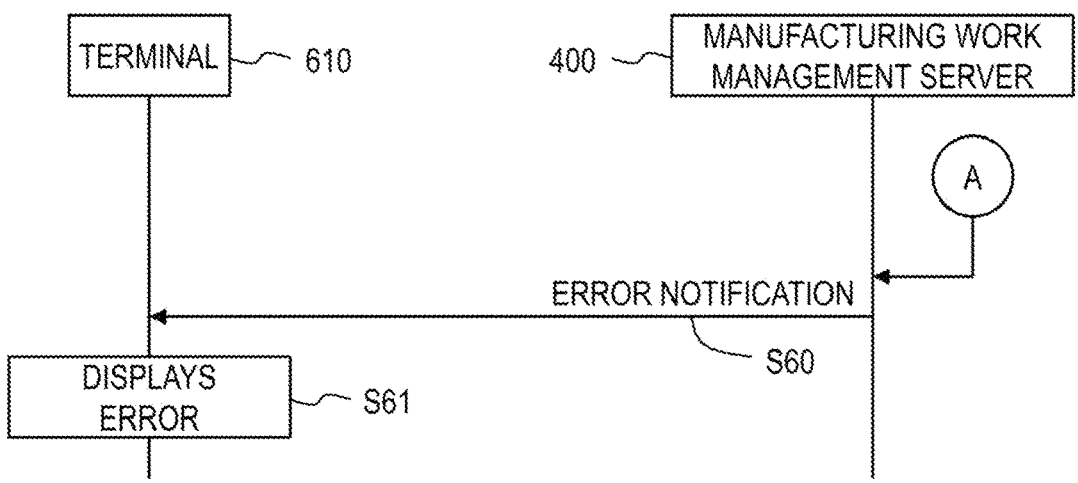
FIG. 16 is a sequence diagram of manufacturing work instruction recording processing according to the embodiment.

FIGS. 15 and 16 are sequence diagrams of manufacturing work instruction recording processing according to this embodiment. With reference to FIGS. 15 and 16, processing related to manufacturing work performed by the terminal 610 and the manufacturing work management server 400 will be described. Note that the terminal 610 is operated by a worker who performs manufacturing work. The worker is authenticated and identifiable by the calibration work management server 100.

In step S51, the terminal 610 transmits a manufacturing instruction (manufacturing work) request to the manufacturing work management server 400 as instructed by the worker.

In step S52, the manufacturing instruction recorder 411 in the manufacturing work management server 400 acquires manufacturing work (manufacturing instruction) assigned to the worker. More specifically, the manufacturing instruction recorder 411 searches for and acquires a record, from among the records in the manufacturing instruction database 340 (see FIG. 5), in which the worker is the worker who operates the terminal 610, the work is yet to be executed, and the date of work is earliest. Whether or not the work has been executed can be determined by the presence or absence of a corresponding record (with matching work attribute) in the manufacturing record database 350 (see FIG. 6).

In step S53, the manufacturing instruction recorder 411 acquires the use propriety and expiration date of the device used in the manufacturing work acquired in step S52. More specifically, the manufacturing instruction recorder 411 acquires a record, from among the records in the device information database 360 (see FIG. 7), in which the device matches the identification information on the device used in the record acquired in step S52 and has the latest date of update. The manufacturing instruction recorder 411 then acquires the use propriety and expiration date for the record.

In step S54, the manufacturing instruction recorder 411 proceeds to step S55 when the device is usable (OK in step S54) and proceeds to step S60 (see FIG. 16) when the device is not usable (NG in step S54). "Usable" means that the use propriety acquired in step S53 is "usable" and that the current point is before the expiration date acquired in step S53.

In step S55, the manufacturing instruction recorder 411 transmits the contents of the record acquired in step S52 to the terminal 610 as a manufacturing instruction.

In step S56, the terminal 610 displays the manufacturing work instruction recording screen 540 (see FIG. 11) to prompt the worker to input a work record including the recorded values of the manufacturing work and the date and time of recording.

In step S57, the terminal 610 receives the input of the work record of the manufacturing work (see the area 542) from the worker.

In step S58, when the worker presses the "worker confirmation" button in the area 543 of the manufacturing work instruction recording screen 540, the terminal 610 transmits the inputted work record of the manufacturing work to the manufacturing work management server 400. The work record includes the recorded values and date of recording inputted in the area 542 and the date of work inputted in the area 543.

In step S59, the manufacturing instruction recorder 411 stores the received work record in the manufacturing record database 350 (see FIG. 6). More specifically, the manufacturing instruction recorder 411 adds a record to the manufacturing record database 350, and stores the values of the work, product, and device used in the record acquired in step S52 as the work, product, and device used in the record. The manufacturing instruction recorder 411 stores the recorded value and date and time of recording included in the work record received in step S58 as the recorded values. The manufacturing instruction recorder 411 also stores the date of work included in the work record received in step S58 as the date of work. The manufacturing instruction recorder 411 stores identification information of the worker who operates the terminal 610, as the worker.

This completes the manufacturing work instruction recording processing when the device used in the manufacturing work is usable. Next, with reference to FIG. 16, processing from step S54 onward when the device used is not usable will be described.

In step S60, the manufacturing instruction recorder 411 transmits an error notification. The error notification includes the identification information and name of the unusable device, and the expiration date of the device.

In step S61, the terminal 610 displays the error notification.

As described above, the work instruction recorder (manufacturing instruction recorder 411) receives a work request from a second terminal (terminal 610) (see step S51).

The work instruction recorder acquires identification information on work performed by a worker who uses the second terminal, work contents, identification information on the worker, identification information on a device used, and use propriety of the device used (see step S52).

When the use propriety of the device is usable (see OK in step S54), the work instruction recorder transmits the work contents and identification information on the device used to the second terminal (see step S55). The work instruction recorder then receives the work record of the work from the second terminal (see step S58) and stores the work record in the work record database (see the manufacturing record database 350) (see step S59).

When the use propriety of the device is not usable (see NG in step S54), the work instruction recorder transmits an error notification to the second terminal (see step S60).

<Features of Manufacturing Work Management System>

The calibration work management server 100 instructs the calibration worker to perform calibration work, and stores the work record including the calibration determination result in the calibration record database 320 (see FIG. 3) (see step S17 in FIG. 12). The calibration work management server 100 requests the approver of the calibration work an approval result of the calibration determination result, and stores the result in the calibration record database 320 (see step S27 in FIG. 13) and also reflects the result in the device information database 360 (see FIG. 7) (see step S28).

The manufacturing work management server 400 determines whether the device used for the manufacturing work is usable or not, when a manufacturing work manager plans (creates) manufacturing work (manufacturing instruction) or instructs a worker to perform the manufacturing work (see step S38 in FIG. 14 and step S54 in FIG. 15).

By performing such processing, the manufacturing work management system 10 can prevent the planning of manufacturing work that uses a device (measuring instrument) whose calibration expiration date has passed or an uncalibrated device, or prevent the execution of manufacturing work with such device. As a result, the manufacturing work management system 10 can support appropriate work management.

<Modification: Processing when Device is not Usable>

In the embodiment described above, when the device is not usable (see NG in step S38 in FIG. 14 and NG in step S54 in FIG. 15), the manufacturing work planning and manufacturing instructions are suspended (step S39 and steps S55 to S59 are skipped). Instead of such processing, manufacturing work may be planned or manufacturing instructions may be given by replacing the device used with another usable device. Such processing can be executed by preparing in advance a database in which equivalent (replaceable) devices are grouped, and replacing an unusable device with an equivalent and usable device.

Instead of suspending the planning and manufacturing instructions, unusable devices may be clearly indicated on the manufacturing work planning screen 530 (see FIG. 10) and the manufacturing work instruction recording screen 540 (see FIG. 11) to alert the manager and the worker. For example, the manufacturing instruction recorder 411 includes an unusable device in the manufacturing instruction template (see step S33 in FIG. 14) or the manufacturing instruction (see step S55 in FIG. 15) and transmits it to the terminal 610. The terminal 610 may alert the manager and the worker by displaying the identification information on the unusable device with a strike-through line in a text box of the device used in the areas 531 and 541. The terminal 610 may set a text box for an unusable device in the areas 531 and 541 to display identification information on the unusable device.

<Modification: Determination of Use Propriety of Device>

In step S28, when the calibration determination result of the device is "appropriate" and the approval result is "approved", the calibration instruction recorder 111 determines that the device is usable. The calibration work approval processing (see FIG. 13) may be omitted. In this case, the calibration instruction recorder 111 may store "usable" or "not usable" as the use propriety in the device information database 360, depending on whether the device calibration determination result is "appropriate" or "inappropriate" in step S17 of the calibration work instruction recording processing (see FIG. 12). Updating the expiration date and date of update is the same as in step S28.

As described above, the calibration instruction recorder 111 stores the device identification information included in the calibration work record as the device identification information in the device information database 360.

The calibration instruction recorder 111 also stores "usable" or "not usable" as the use propriety of the device in the device information database 360, depending on whether the device calibration determination result included in the calibration work record is "appropriate" or "inappropriate".

When storing the use propriety in the device information database 360, the calibration instruction recorder 111 stores in the device information database 360 an expiration date determined by a predetermined method (for example, a date after a predetermined period from the date of the calibration work).

<Modification: Manufacturing Work Planning Processing>

In steps S37 and S39 of the manufacturing work planning processing shown in FIG. 14, the manufacturing instruction recorder 411 refers to the record in the manufacturing instruction master database 330 (see FIG. 4) acquired in step S32. Instead of such processing, the manufacturing instruction recorder 411 may transmit the identification information on a work master in the record to the terminal 610 in step S33, and receive a work plan registration request including the identification information in step S36.

As described above, the work instruction recorder (see the manufacturing instruction recorder 411) receives a work plan registration request including work master identification information and worker identification information from a third terminal (see the terminal 610) (see step S36) and acquires the use propriety of the device used (see step S37).

When the use propriety of the device is "usable" (see OK in step S38), the work instruction recorder stores the work contents corresponding to the work master identification information, the identification information on the worker, and the identification information on the device used in the work instruction database (see the manufacturing instruction database 340) (see step S39).

When the use propriety of the device is "not usable" (see NG in step S38), the work instruction recorder transmits an error notification to the third terminal (see step S40).

Upon receiving a work plan registration request that further includes the date and time of work from the third terminal (see step S36), the work instruction recorder acquires the use propriety and expiration date of the device used (see step S37).

When the use propriety of the device is "usable" and the date and time of work is before the expiration date (see OK in step S38), the work instruction recorder stores the work contents corresponding to the work master identification information, the identification information on the worker, and the identification information on the device used in the work instruction database (see step S39).

When the use propriety of the device is "not usable" or the date and time of work is past the expiration date (see NG in step S38), the work instruction recorder transmits an error notification to the third terminal (see step S40).

OTHER MODIFICATIONS

Although several embodiments of the present invention have been described above, these embodiments are merely illustrative and do not limit the technical scope of the present invention. The manufacturing work management system 10 manages manufacturing work, but may be a work management system for other work. For example, the manufacturing work management system 10 may be a work management system for inspection work on manufactured products. When a device used in the inspection work is not usable when planning the inspection work or giving work instructions for the inspection work, the work management system may suspend the planning or work instructions. The same work management is possible for work using measuring instruments, besides manufacturing work and inspection work.

The present invention can adopt various other embodiments, and various changes such as omissions and substitutions can be made without departing from the gist of the present invention. These embodiments and their modifications are included within the scope and gist of the invention described in this specification and the like, as well as within the scope of the invention described in the claims and its equivalents.

What is claimed is:

1. A work management system comprising:
a calibration instruction computer and a work instruction computer connected to a calibration instruction computer via a network,
wherein the calibration instruction computer is programmed to:
access a calibration instruction database that stores calibration work identification information, identification information on a device to be calibrated, calibration work contents, and calibration worker identification information,
access a calibration record database that stores the calibration work identification information, the device identification information, the calibration worker identification information, date and time of calibration work, and a calibration determination result, and
access a device information database that stores the identification information on the device and use propriety of the device,
wherein the work instruction computer is programmed to:
access a work instruction database that stores work identification information, work contents, worker identification information, and the identification information on the device used,
access a work record database that stores the work identification information, the worker identification information, and date and time of work, and
access the device information database,
wherein the calibration instruction computer is programmed to execute processing including:
receiving a calibration work request from a first terminal, acquiring identification information on the device to be calibrated by a calibration worker who uses the first terminal and the calibration work contents, and transmitting the identification information and calibration work contents to the first terminal,
receiving a calibration work record of the calibration work from the first terminal and storing the calibration work record in the calibration record database,
storing device identification information included in the calibration work record as the device identification information in the device information database, and
storing "usable" or "not usable" as use propriety of the device in the device information database, depending on whether the calibration determination result included in the calibration work record is "appropriate" or "inappropriate", and
wherein the work instruction computer is programmed to execute processing including:
receiving a work request from a second terminal,
acquiring identification information on the work performed by the worker who uses the second terminal, the work contents, the worker identification information, the identification information on the device used, and the use propriety of the device used,
transmitting the work contents and the identification information on the device used to the second terminal when the use propriety of the device is "usable",
receiving a work record of the work from the second terminal, and storing the work record in the work record database, and
transmitting an error notification to the second terminal when the use propriety of the device is "not usable".

2. The work management system according to claim 1, wherein the work instruction computer is programmed to:
access a work instruction master database that stores work master identification information, the work contents, and the identification information on the device used,
receive a work plan registration request including the work master identification information and the worker identification information from a third terminal,
acquire a use propriety of the device used,
store work contents corresponding to the work master identification information, the worker identification information, and the identification information on the device used in the work instruction database when the use propriety of the device is "usable", and
transmit an error notification to the third terminal when the use propriety of the device is "not usable".

3. The work management system according to claim 2, wherein the device information database further includes an expiration date indicating a valid expiration date when the use propriety is "usable",
wherein the calibration instruction computer is programmed to store the expiration date determined by a predetermined method in the device information database when storing the use propriety in the device information database,
wherein the work instruction computer is programmed to:
acquire the use propriety and the expiration date of the device used when receiving the work plan registration request further including the date and time of work from the third terminal,
store work contents corresponding to the work master identification information, the worker identification information, and the identification information on the device used in the work instruction database, when the use propriety of the device is "usable" and the date and time of work is before the expiration date, and transmit an error notification to the third terminal when the use propriety of the device is "not usable" or the date and time of work is past the expiration date.

4. A calibration work management server comprising:

a calibration instruction computer, wherein the calibration instruction computer is programmed to access:

a calibration instruction database that stores calibration work identification information, identification information on a device to be calibrated, calibration work contents, and calibration worker identification information, a calibration record database that stores the calibration work identification information, the device identification information, the calibration worker identification information, date and time of calibration work, and a calibration determination result, and a device information database that stores the device identification information and use propriety of the device, and wherein the calibration instruction computer is programmed to:

receive a calibration work request from a first terminal, acquire identification information on the device to be calibrated by a calibration worker who uses the first terminal and the calibration work contents, and transmitting the identification information and calibration work contents to the first terminal, receive a calibration work record of the calibration work from the first terminal and storing the calibration work record in the calibration record database, store device identification information included in the calibration work record as the device identification information in the device information database, and store "usable" or "not usable" as use propriety of the device in the device information database, depending on whether the calibration determination result included in the calibration work record is "appropriate" or "inappropriate", wherein the device information database is accessed by a work management server, wherein the work management server includes a work instruction computer that is programmed to access;

a work instruction database that stores work identification information, work contents, worker identification information, and the identification information on the device used, and a work record database that stores the work identification information, the worker identification information, and date and time of work, and wherein the work instruction computer is programmed to:

receive a work request from a second terminal, acquire identification information on the work performed by the worker who uses the second terminal, the work contents, the worker identification information, the identification information on the device used, and the use propriety of the device used, transmit the work contents and the identification information on the device used to the second terminal when the use propriety of the device is "usable", receiving a work record of the work from the second terminal, and storing the work record in the work record database, and transmit an error notification to the second terminal when the use propriety of the device is "not usable".

5. A calibration work management method, wherein a calibration work management server is programmed to access;

a calibration instruction database that stores calibration work identification information, identification information on a device to be calibrated, calibration work contents, and calibration worker identification information, a calibration record database that stores the calibration work identification information, the device identification information, the calibration worker identification information, date and time of calibration work, and a calibration determination result, and a device information database that stores the device identification information and use propriety of the device, wherein the calibration work management server performs steps comprising:

receiving a calibration work request from a first terminal, acquiring identification information on the device to be calibrated by a calibration worker who uses the first terminal and the calibration work contents, and transmitting the identification information and calibration work contents to the first terminal, receiving a calibration work record of the calibration work from the first terminal and storing the calibration work record in the calibration record database, storing device identification information included in the calibration work record as the device identification information in the device information database, and storing "usable" or "not usable" as use propriety of the device in the device information database, depending on whether the calibration determination result included in the calibration work record is "appropriate" or "inappropriate", wherein the device information database is accessed by a work management server, wherein the work management server includes a work instruction computer that is programmed to access;

a work instruction database that stores work identification information, work contents, worker identification information, and the identification information on the device used, and a work record database that stores the work identification information, the worker identification information, and date and time of work, and wherein the work instruction computer performs steps comprising:

receiving a work request from a second terminal, acquiring identification information on the work performed by the worker who uses the second terminal, the work contents, the worker identification information, the identification information on the device used, and the use propriety of the device used, transmitting the work contents and the identification information on the device used to the second terminal when the use propriety of the device is "usable", receiving a work record of the work from the second terminal, and storing the work record in the work record database, and transmitting an error notification to the second terminal when the use propriety of the device is "not usable".

* * * * *